United States Patent
Shostak et al.

(10) Patent No.: US 10,334,269 B2
(45) Date of Patent: Jun. 25, 2019

(54) SELECTIVELY BYPASSING INTRA PREDICTION CODING BASED ON PREPROCESSING ERROR DATA

(71) Applicant: Intel Corporation, Santa Clara, CA (US)

(72) Inventors: Nikolai P. Shostak, Krasnogorsk (RU); Pavel S. Koval, Moscow (RU); Leonid A. Kulakov, Moscow (RU); Sergey A. Osipov, Moscow (RU)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 15/504,816

(22) PCT Filed: Aug. 25, 2014

(86) PCT No.: PCT/IB2014/002076
§ 371 (c)(1),
(2) Date: Feb. 17, 2017

(87) PCT Pub. No.: WO2016/030706
PCT Pub. Date: Mar. 3, 2016

(65) Prior Publication Data
US 2017/0280151 A1 Sep. 28, 2017

(51) Int. Cl.
*H04N 19/513* (2014.01)
*H04N 19/176* (2014.01)
(Continued)

(52) U.S. Cl.
CPC ......... *H04N 19/513* (2014.11); *H04N 19/103* (2014.11); *H04N 19/107* (2014.11);
(Continued)

(58) Field of Classification Search
CPC .. H04N 19/513; H04N 19/103; H04N 19/107; H04N 19/147; H04N 19/176; H04N 19/503; H04N 19/593; H04N 19/85
(Continued)

(56) References Cited

U.S. PATENT DOCUMENTS

2007/0071105 A1    3/2007  Tian et al.
2007/0121728 A1    5/2007  Wang et al.
(Continued)

FOREIGN PATENT DOCUMENTS

EP    1696676 A2    8/2006

OTHER PUBLICATIONS

"High efficiency video coding", Series H: Audiovisual and Multimedia Systems Infrastructure of audiovisual services—Coding of moving video, International Telecommunication Union, Apr. 2013, 21 pages.
(Continued)

*Primary Examiner* — Nguyen T Truong
(74) *Attorney, Agent, or Firm* — Jordan IP Law, LLC

(57) ABSTRACT

Methods and systems may provide for determining, on a graphics processor, an intra prediction error for a coding unit of a video frame and selectively bypassing, on a host processor, an intra prediction coding stage with respect to one or more of a recursive split decision or an encoding mode selection based at least in part on the intra prediction error. In one example, an inter prediction error may also be determined, on the graphics processor, wherein the intra prediction coding stage is selectively bypassed further based on the inter prediction error.

16 Claims, 5 Drawing Sheets

(51) Int. Cl.
*H04N 19/147* (2014.01)
*H04N 19/103* (2014.01)
*H04N 19/107* (2014.01)
*H04N 19/85* (2014.01)
*H04N 19/503* (2014.01)
*H04N 19/593* (2014.01)

(52) U.S. Cl.
CPC ......... *H04N 19/147* (2014.11); *H04N 19/176* (2014.11); *H04N 19/503* (2014.11); *H04N 19/593* (2014.11); *H04N 19/85* (2014.11)

(58) Field of Classification Search
USPC .................................................. 375/240.16
See application file for complete search history.

(56) References Cited

U.S. PATENT DOCUMENTS

| | | |
|---|---|---|
| 2008/0089595 A1 | 4/2008 | Park |
| 2009/0097556 A1 | 4/2009 | Nakagami et al. |
| 2011/0194615 A1 | 8/2011 | Zheludkov |

OTHER PUBLICATIONS

Wei Jiang et al., "Graident Based Fast Mode Decision Algorithm for Intra Prediction in HEVC", 2012 IEEE, Apr. 2012, pp. 1836-1480.

Iain Richardson, "HEVC: An Introduction to High Efficiency Video Coding: Summary", vcodex.com, 2013, 5 pages.

International Search Report for International Patent Application No. PCT/IB2014/002076, dated May 6, 2015, 4 pages.

Written Opinion for International Patent Application No. PCT/IB2014/002076, dated May 6, 2015, 7 pages.

Fangshun Mu et al., "Fast coding unit depth decision for HEVC," 2013 IEEE International Conference on Multimedia and Expo (ICME), IEEE, Jul. 14, 2014, 6 pages.

Changcai Lai et al., "Adaptive intra mode skipping algorithm for inter frame coding of H.264/AVC", Visual Communication and Image Processing 2005, Jul. 12, 2005, Beijing, China, 1 page, Abstract only.

Nagai-Man Cheung et al., "Video Coding on Multi-Core Graphics Processors", IEEE Signal Processing Magazine, vol. 27, No. 2, Mar. 1, 2010, 10 pages.

SELECTIVELY BYPASSING INTRA PREDICTION CODING BASED ON PREPROCESSING ERROR DATA

CROSS-REFERENCE WITH RELATED APPLICATIONS

This application is a U.S. National Phase Patent Application which claims benefit to International Patent Application No. PCT/IB2014/002076 filed on Aug. 25, 2014.

BACKGROUND

Video encoders may be used to compress video signals prior to transmission and/or storage in order to reduce the bandwidth and/or memory space requirements of the video signals. For example HEVC (High Efficiency Video Coding, e.g., H.265 Series H: Audiovisual and Multimedia Systems, Infrastructure of audiovisual services—Coding of moving video, Telecommunication Standardization Sector of ITU, April 2013) may divide each frame of a video signal into a 64×64 pixel element/pel coding block (CB), recursively decide whether to process the coding block as a 64×64 coding unit (CU) or split the coding block into smaller coding units (e.g., 32×32, 16×16, etc.), and select an encoding mode that attempts to minimize the cost of compression (e.g., compression ratio, encoding time).

The encoding mode may generally be either an inter prediction mode that references data (e.g., motion vectors) from other frames or an intra prediction mode that references data (e.g., neighboring pixels) from within the current frame. Inter prediction may be effective when the scene of a video has not changed much from previous frames. Intra prediction, on the other hand, may be more effective when the scene in the current frame has changed from previous frames. The decision whether to split the coding block may involve recursively applying both an intra prediction coding stage and an inter prediction coding stage to the coding units in order to determine the appropriate unit size based on the relative cost of compression between the two encoding modes. Applying the intra prediction coding stage to the coding units on each pass of the split decision, however, may unnecessarily increase encoding time, particularly for video signals in which scene changes are infrequent and intra prediction is not likely to be selected as the encoding mode.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
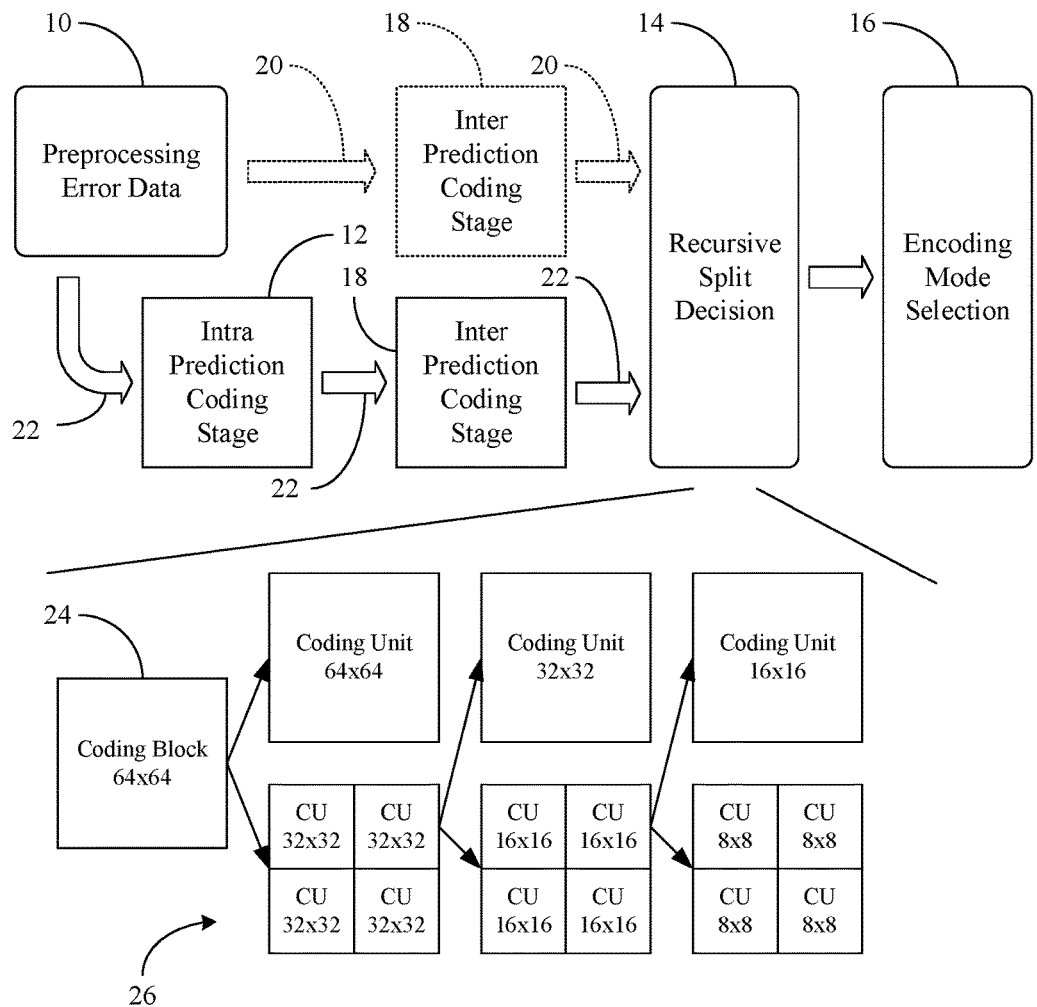
FIG. 1 is a block diagram of an example of an encoding process according to an embodiment.

FIG. 1 shows an encoding process for media signals (e.g., video signals, multimedia signals, etc.) in which preprocessing error data 10 is used to selectively bypass an intra prediction coding stage 12 with respect to a recursive split decision 14 and/or an encoding mode selection 16. The recursive split decision 14 may generally involve determining whether to process coding block 24 (e.g., 64×64 pels) of a media signal frame as a 64×64 coding unit or split the coding block 24 into smaller coding units 26 (e.g., 32×32, 16×16, 8×8, etc.). Thus, the illustrated coding block 24 may be encoded as a single coding unit (CU) of size 64×64 or split into four smaller CUs of size 32×32. For each 32×32 CU, the same decision may be made—namely, encode CU as is (i.e., 32×32) or split it into four smaller CUs of size 16×16. In the illustrated example, the smallest CU size is 8×8. The encoding mode selection 16 may generally involve selecting between an intra prediction encoding mode and an inter prediction coding mode for the coding unit in question.

Thus, bypassing the intra prediction coding stage 12 may result in an optimized encoding path 20 that contains only an inter prediction coding stage 18 and is less time consuming than a standard encoding path 22 that contains both the intra prediction coding stage 12 and the inter prediction coding stage 18. Indeed, the intra prediction coding stage 12 may involve checking dozens (e.g., thirty-five) different intra prediction modes on each pass of the recursive split analysis, which may be responsible for a considerable amount (e.g., 30-50%) of the overall encoding time. The optimized encoding path 20 may therefore enable media signals to be compressed more quickly without significantly increasing the number of encoded bits (e.g., without negatively impacting the compression ratio). Such an approach may be particularly useful for media signals in which scene changes are infrequent and intra prediction is not likely to be selected as the encoding mode.

As will be discussed in greater detail, the preprocessing error data 10 may include an intra prediction error that is determined by, for example, a video motion estimation (VME) skip and intra check (SIC, with no skip check being performed) function of a graphics processor, wherein the intra prediction error may be a single sum of absolute differences (SAD) value per 16×16 coding unit. As will be discussed in greater detail, the SAD value may be scaled up or down from the 16×16 coding unit size to correspond to the size of the coding unit being processed. The single SAD value may quantify the amount of error encountered during intra prediction preprocessing of the coding unit.

The preprocessing error data 10 may also include an inter prediction error that is determined by, for example, a vector locator that identifies a motion vector for the current frame relative to a reference frame (e.g., with integer pel accuracy) and a vector modifier that refines the motion vector to obtain the inter prediction error (e.g., with ¼ pel accuracy). The motion vector may generally provide directional movement information for content within the media signal. In one example, the vector locator is a VME integer motion estimation (IME) function and the vector modifier is a VME fractional and bi-prediction refinement (FBR, with no bi-prediction refinement being performed) function, wherein the inter prediction error may also be a single SAD value. Moreover, the VME functions may be relatively fast and power-efficient fixed-functionality components of the graphics processor so that the impact on encoding time is minimal.

Figure 2:
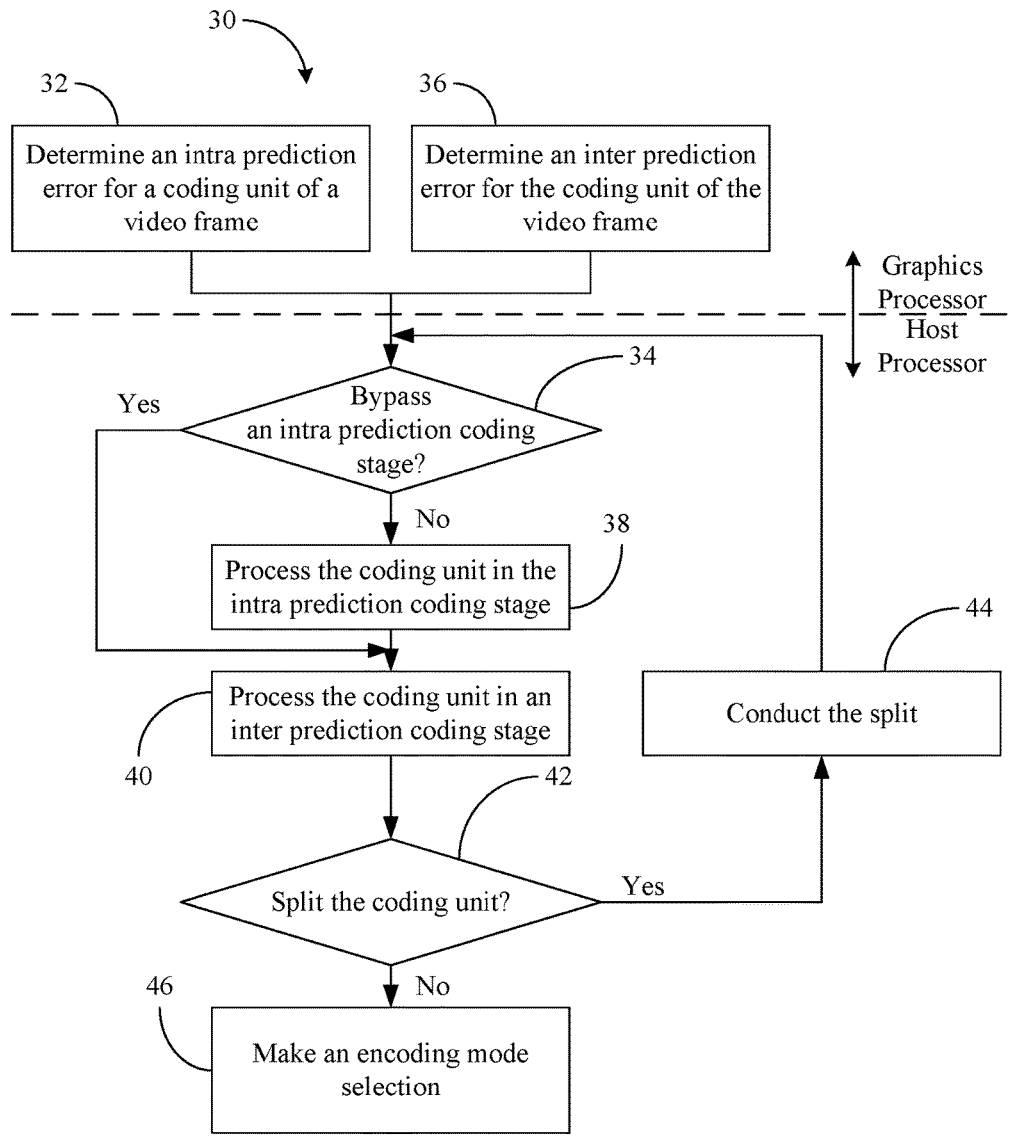
FIG. 2 is a flowchart of an example of a method of selectively bypassing an intra prediction coding stage according to an embodiment.

FIG. 2 shows a method 30 of selectively bypassing an intra prediction coding stage. The method 30 may be implemented as modules in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. In one example, the method 30 is implemented in a hybrid encoding scheme including a graphics processor (e.g., graphics processing unit/GPU) and a host processor (e.g., central processing unit/CPU).

Illustrated processing block 32 determines, on a graphics processor, an intra prediction error for a coding unit of a video frame. Block 34 may determine whether to bypass an intra prediction coding stage on a host processor based at least in part on the intra prediction error. In the illustrated example, an inter prediction error is also determined for the coding unit of the video frame at block 36, wherein the determination at block 34 may take into consideration both the intra prediction error and the inter prediction error. The final results of the preprocessing stage may be two arrays with comparable SAD values—one for each 16×16 block:

IntraSAD [FrameHeight/16][Framewidth/16]
InterSAD [FrameHeight/16][Framewidth/16]

For example, block 34 might include determining a ratio of the intra prediction error to the inter prediction error (e.g., IntraSAD/InterSAD). Thus, if the ratio exceeds a certain threshold, the illustrated block 34 bypasses the intra prediction coding stage and processes the coding unit only in the inter prediction coding stage at block 40. Otherwise, block 34 may ensure that the coding unit is processed in the intra prediction coding stage at block 38 in addition to the inter prediction coding stage at block 40.

Block 34 may also include mapping the intra prediction error and the inter prediction error to a different sized coding unit. For example, for a coding unit size N×N and top-left pixel coordinates (X,Y), where N=4, 8, 16, 32 or 64, X≥0, X<Framewidth, Y≥0, Y<Frameheight, the coding unit may be mapped to 16×16 blocks so that it covers one, four or sixteen 16×16 blocks. Values for those blocks may then be fetched from the IntraSAD and InterSAD arrays. If the coding unit covers more than one 16×16 block, the corresponding SAD values may be summed up. Below is an example of pseudo code that may conduct such an operation.

```
IntraSAD = 0
InterSAD = 0
for (y = 0; y < (N + 15) / 16; y++) {
   for (x = 0; x < (N+15) / 16; x++) {
      IntraSAD_Acc = IntraSAD_Acc + IntraSAD [Y / 16 + y] [X / 16 + x]
      InterSAD_Acc = InterSAD_Acc + InterSAD [Y / 16 + y] [X / 16 + x]
   }
)
```

A recursive split decision may be made at block 42 based on the results of the inter prediction coding stage (and the intra prediction coding stage if not bypassed), wherein if it is determined that a smaller coding unit size is appropriate, illustrated block 44 conducts the split (e.g., converting a 64×64 coding unit into four 32×32 coding units) and the host processor encoder may repeat the determination at block 34. If illustrated block 42 determines that a split is not appropriate, an encoding mode selection may be made at block 46. As already noted, the encoding mode selection may involve selecting between an intra prediction encoding mode and an inter prediction encoding mode.

Figure 3:
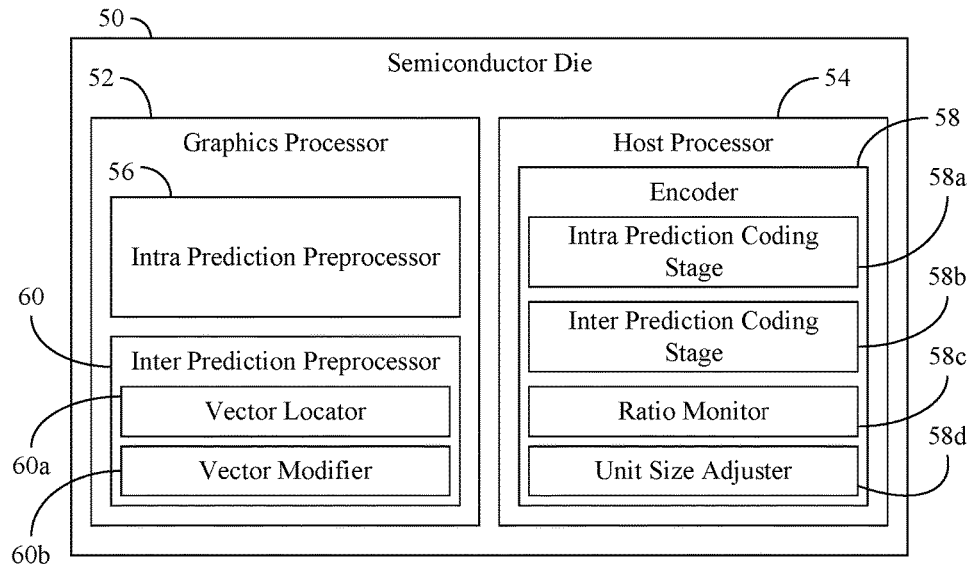
FIG. 3 is a block diagram of an example of a logic architecture according to an embodiment.

FIG. 3 shows a semiconductor die 50 that includes a logic architecture having a graphics processor 52 and a host processor 54. The illustrated logic architecture uses a hybrid encoding scheme to compress media signals such as video and/or multimedia content. The graphics processor 52 may include an intra prediction preprocessor 56 to determine intra prediction errors (e.g., SAD values) for coding units of video frames, wherein the host processor 54 may include an encoder 58 (58a-58d) having an intra prediction coding stage 58a. The encoder 58 may selectively bypass the intra prediction coding stage 58a with respect to one or more of a recursive split decision or an encoding mode selection based at least in part on the intra prediction errors. When the intra prediction coding stage 58a is bypassed, only an inter prediction coding stage 58b of the encoder 58 is used to encode the coding units, in the illustrated example.

In one example, the graphics processor 52 also includes an inter prediction preprocessor 60 (60a, 60b) to determine inter prediction errors (e.g., SAD values) for the coding units, wherein the intra prediction coding stage 58a may be selectively bypassed further based on the inter prediction errors. In such a case, the encoder 58 may further include a ratio monitor 58c that determines ratios of the intra prediction errors to the inter prediction errors, wherein the intra prediction coding stage 58a may be bypassed if the ratios exceed a threshold (e.g., 1.5). Additionally, the inter prediction preprocessor 60 may include a vector locator 60a to identify motion vectors for frames relative to a reference frame and a vector modifier 60b to refine the motion vectors to obtain the inter prediction errors. As already noted, the intra prediction errors and the inter prediction errors may include SAD values. In one example, the preprocessors 56, 60 are implemented as fixed-functionality VME modules. Moreover, the encoder 58 may also include a unit size adjuster 58d to map the intra prediction errors and the inter prediction errors to different sized coding units.

Figure 4:
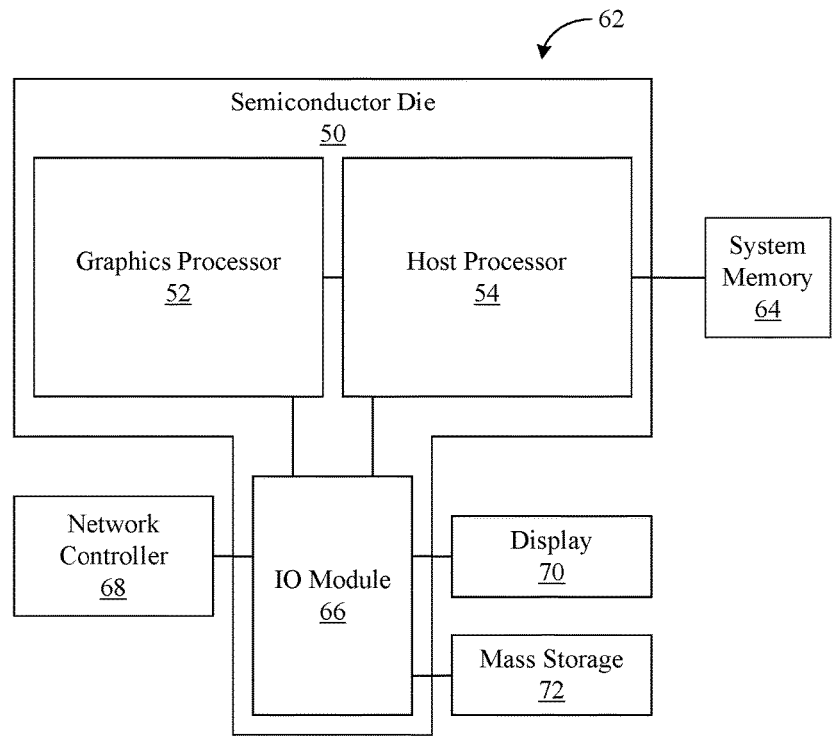
FIG. 4 is a block diagram of an example of a system according to an embodiment.

Turning now to FIG. 4, a computing system 62 is shown, wherein the system 62 may be part of a mobile platform such as a laptop, mobile Internet device (MID), personal digital assistant (PDA), media player, imaging device, wearable computer, etc., any smart device such as a smart phone, smart tablet, smart TV (television) and so forth, or any combination thereof. The system 62 may also be part of a fixed platform such as a personal computer (PC), server, workstation, etc. The illustrated system 62 includes the semiconductor die 50 having the host processor 54 with an integrated memory controller (iMC, not shown) that provides access to system memory 64, which may include, for example, double data rate (DDR) synchronous dynamic random access memory (SDRAM, e.g., DDR3 SDRAM JEDEC Standard JESD79-3C, April 2008) modules. The modules of the system memory 64 may be incorporated, for example, into a single inline memory module (SIMM), dual inline memory module (DIMM), small outline DIMM (SODIMM), and so on.

The host processor 54 may also include one or more processor cores (not shown), where each core may be fully functional with instruction fetch units, instruction decoders, level one (L1) cache, execution units, and so on. The host processor 54 may alternatively communicate with an off-chip variation of the iMC, also known as a Northbridge, via a front side bus or a point-to-point fabric that interconnects each of the components in the system 62. The host processor 54 may also execute an operating system (OS, not shown).

The illustrated host processor 54 communicates with an input/output (IO) module 66, also known as a Southbridge, via a bus. The iMC/host processor 54 and the IO module 66 are sometimes referred to as a chipset. The host processor 54 may also be operatively connected to a network (not shown) via a network port through the IO module 66 and a network controller 68. Thus, the network controller 68 may provide off-platform communication functionality for a wide variety of purposes such as wired communication or wireless communication including, but not limited to, cellular telephone (e.g., Wideband Code Division Multiple Access, W-CDMA (Universal Mobile Telecommunications System/UMTS), CDMA2000 (IS-856/IS-2000), etc.), Wi-Fi (Wireless Fidelity, e.g., Institute of Electrical and Electronics Engineers/IEEE 802.11, 2007 Edition), Bluetooth (e.g., IEEE 802.15.1-2005, Wireless Personal Area Networks), WiMax (e.g., IEEE 802.16-2004), Global Positioning System (GPS), spread spectrum (e.g., 900 MHz), and other radio frequency (RF) telephony purposes. The IO module 66 may also communicate with a display 70 to provide for the visual output/presentation of video, images, and other content. The network controller 68 may communicate with the IO module 66 to provide support for user interface devices (not shown) such as a keypad, mouse, etc., in order to allow a user to interact with and perceive information from the system 62.

The IO module 66 may also have internal controllers (not shown) such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The illustrated IO module 66 is also coupled to one or more mass storage devices 72, which may include a hard drive, read only memory (ROM), optical disk, flash memory, etc.

The illustrated system 62 also includes the graphics processor 52 integrated into the semiconductor die 50 (e.g., in a system on chip/SoC configuration) along with the host processor 54 and the IO module 66. The graphics processor 52 may alternatively be coupled to a dedicated graphics memory (not shown), wherein the dedicated graphics memory may include, for example, GDDR (graphics DDR) or DDR SDRAM modules, or any other memory technology suitable for supporting graphics rendering. The graphics processor 52 and graphics memory might also be installed on a graphics/video card, wherein the graphics processor 52 may communicate with the host processor 54 via a graphics bus such as a PCI Express Graphics (PEG, e.g., Peripheral Components Interconnect/PCI Express x16 Graphics 150W-ATX Specification 1.0, PCI Special Interest Group) bus, or Accelerated Graphics Port (e.g., AGP V3.0 Interface Specification, September 2002) bus. The graphics card and/or graphics processor 52 may be integrated onto a system motherboard, configured as a discrete card on the motherboard, etc.

The mass storage devices 72 may be configured to store one or more video frames associated with a media signal. As already discussed, the graphics processor 52 may include an intra prediction preprocessor to determine an intra prediction error for a coding unit of the video frame. Additionally, the host processor 54 may include an encoder having an intra prediction coding stage, wherein the encoder selectively bypasses the intra prediction coding stage with respect to one or more of a recursive split decision or an encoding mode selection based at least in part on the intra prediction error. In one example, the graphics processor further includes an inter prediction preprocessor to determine an inter prediction error for the coding unit. In such a case, the intra prediction coding stage may be selectively bypassed further based on the inter prediction error.

Figure 5:
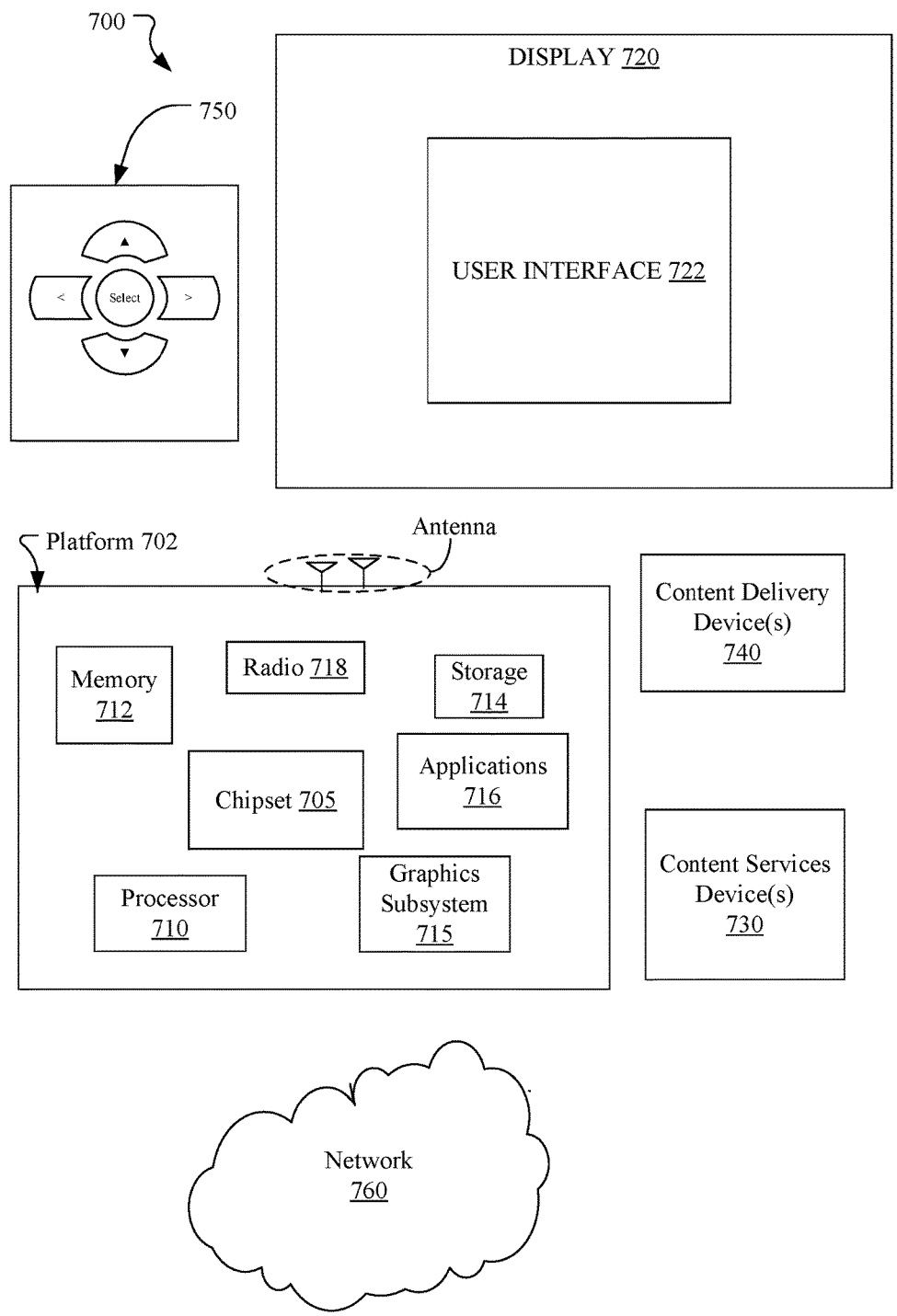
FIG. 5 is a block diagram of an example of a system having a navigation controller according to an embodiment.

FIG. 5 illustrates an embodiment of a system 700. In embodiments, the system 700 may be a media system although system 700 is not limited to this context. For example, the system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, the storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. The graphics subsystem 715 may therefore include the graphics processor 52 (FIG. 3), already discussed. In addition, the processor 710 may be configured to include the host processor 54 (FIG. 3), already discussed. An analog or digital interface may be used to communicatively couple the graphics subsystem 715 and display 720. For example, the interface may be any of a High-Definition Multimedia Interface (HDMI), MIPI (Mobile Industry Processor Interface), WiGIG (Wireless Gigabit Alliance), DisplayPort, wireless HDMI, and/or wireless HD compliant techniques. The graphics subsystem 715 may be integrated into processor 710 or chipset 705. The graphics subsystem 715 may be a stand-alone card communicatively coupled to the chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
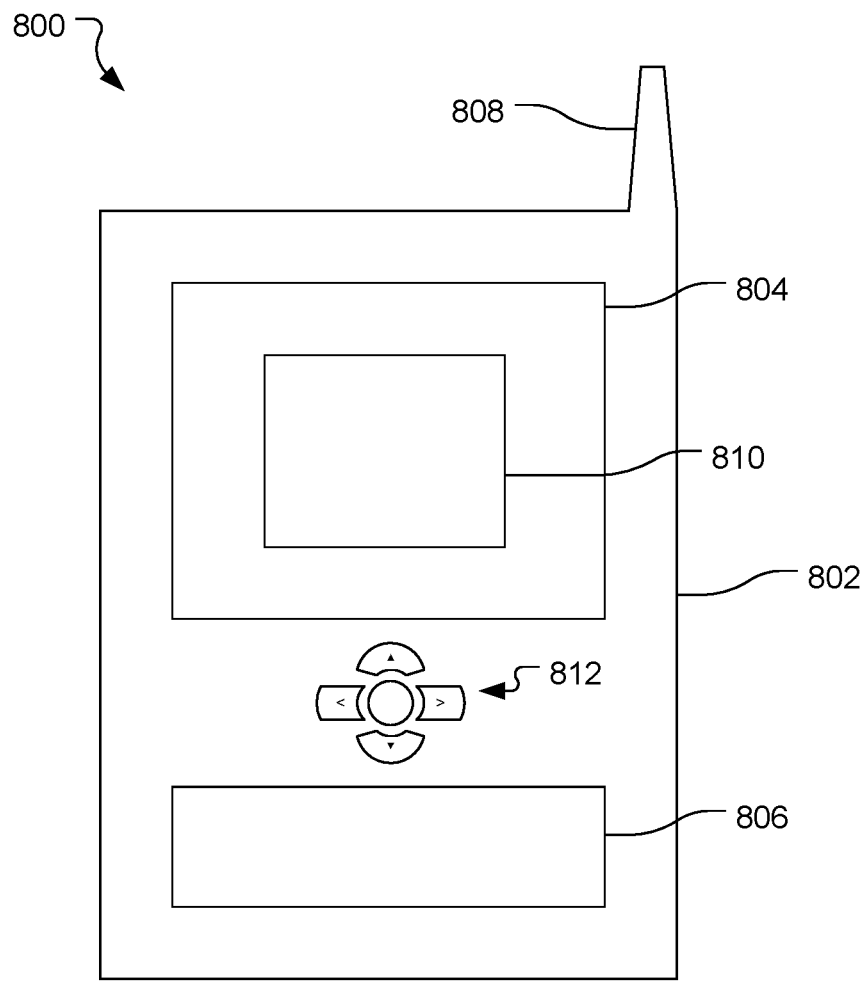
FIG. 6 is a block diagram of an example of a system having a small form factor according to an embodiment.

As described above, the system 700 may be embodied in varying physical styles or form factors. FIG. 6 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

Additional Notes and Examples

Example 1 may include a system to encode media signals, comprising a mass storage device to store a video frame associated with a media signal, a graphics processor including an inter prediction preprocessor to determine an intra prediction error for a coding unit of the video frame, and a host processor including an encoder having an intra prediction coding stage, the encoder to selectively bypass the intra prediction coding stage with respect to one or more of a recursive split decision or an encoding mode selection based at least in part on the intra prediction error.

Example 2 may include the system of Example 1, wherein the graphics processor further includes an inter prediction preprocessor to determine an inter prediction error for the coding unit, and wherein the intra prediction coding stage is to be selectively bypassed further based on the inter prediction error.

Example 3 may include the system of Example 2, wherein the host processor further includes a ratio monitor to determine a ratio of the intra prediction error to the inter prediction error, and wherein the intra prediction coding stage is to be bypassed if the ratio exceeds a threshold.

Example 4 may include the system of Example 2, wherein the intra prediction error and the inter prediction error are to include sum of absolute difference (SAD) values.

Example 5 may include the system of Example 2, wherein the inter prediction preprocessor includes a vector locator to identify a motion vector for the frame relative to a reference frame, and a vector modifier to refine the motion vector to obtain the inter prediction error.

Example 6 may include the system of any one of Examples 2 to 5, wherein the encoder includes a unit size adjuster to map the intra prediction error and the inter prediction error to a different sized coding unit.

Example 7 may include a method of reducing encoding time, comprising determining, on a graphics processor, an intra prediction error for a coding unit of a video frame, and selectively bypassing, on a host processor, an intra prediction coding stage with respect to one or more of a recursive split decision or an encoding mode selection based at least in part on the intra prediction error.

Example 8 may include the method of Example 7, further including determining, on the graphics processor, an inter prediction error for the coding unit, wherein the intra prediction coding stage is selectively bypassed further based on the inter prediction error.

Example 9 may include the method of Example 8, further including determining a ratio of the intra prediction error to the inter prediction error, wherein the intra prediction coding stage is bypassed if the ratio exceeds a threshold.

Example 10 may include the method of Example 8, wherein the intra prediction error and the inter prediction error include sum of absolute difference (SAD) values.

Example 11 may include the method of Example 8, wherein determining the inter prediction error includes identifying a motion vector for the frame relative to a reference frame, and refining the motion vector to obtain the inter prediction error.

Example 12 may include the method of any one of Examples 8 to 11, further including mapping, on the host processor, the intra prediction error and the inter prediction error to a different sized coding unit.

Example 13 may include at least one computer readable storage medium comprising a set of instructions which, when executed by a computing system including a graphics processor and a host processor, cause the computing system to determine, on the graphics processor, an intra prediction error for a coding unit of a video frame, and selectively bypass, on the host processor, an intra prediction coding stage with respect to one or more of a recursive split decision or an encoding mode selection based at least in part on the intra prediction error.

Example 14 may include the at least one computer readable storage medium of Example 13, wherein the instructions, when executed, cause the computing system to determine, on the graphics processor, an inter prediction error for the coding unit, and wherein the intra prediction coding stage is to be selectively bypassed further based on the inter prediction error.

Example 15 may include he at least one computer readable storage medium of Example 14, wherein the instructions, when executed, cause the computing system to determine a ratio of the intra prediction error to the inter prediction error, and wherein the intra prediction coding stage is to be bypassed if the ratio exceeds a threshold.

Example 16 may include the at least one computer readable storage medium of Example 14, wherein the intra prediction error and the inter prediction error are to include sum of absolute difference (SAD) values.

Example 17 may include the at least one computer readable storage medium of Example 14, wherein the instructions, when executed, further cause the computing system to identify a motion vector for the frame relative to a reference frame, and refine the motion vector to obtain the inter prediction error.

Example 18 may include the at least one computer readable storage medium of any one of Examples 14 to 17, wherein the instructions, when executed, cause the computing system to map, on the host processor, the intra prediction error and the inter prediction error to a different sized coding unit.

Example 19 may include an apparatus to reduce encoding time, comprising a graphics processor including an intra prediction preprocessor to determine an intra prediction error for a coding unit of a video frame, and a host processor including an encoder having an intra prediction coding stage, the encoder to selectively bypass the intra prediction coding stage with respect to one or more of a recursive split decision or an encoding mode selection based at least in part on the intra prediction error.

Example 20 may include the apparatus of Example 19, wherein the graphics processor further includes an inter prediction preprocessor to determine an inter prediction error for the coding unit, and wherein the intra prediction coding stage is to be selectively bypassed further based on the inter prediction error.

Example 21 may include the apparatus of Example 20, wherein the host processor further includes a ratio monitor to determine a ratio of the intra prediction error to the inter prediction error, and wherein the intra prediction coding stage is to be bypassed if the ratio exceeds a threshold.

Example 22 may include the apparatus of Example 20, wherein the intra prediction error and the inter prediction error are to include sum of absolute difference (SAD) values.

Example 23 may include the apparatus of Example 20, wherein the inter prediction preprocessor includes a vector locator to identify a motion vector for the frame relative to a reference frame, and a vector modifier to refine the motion vector to obtain the inter prediction error.

Example 24 may include the apparatus of any one of Examples 20 to 23, wherein the encoder includes a unit size adjuster to map the intra prediction error and the inter prediction error to a different sized coding unit.

Example 25 may include an apparatus to reduce encoding time, comprising means for performing the method of any of Examples 7 to 12.

Techniques described herein may therefore remove the intra prediction coding stage for those coding units (CUs) that are unlikely to be intra prediction encoded. In one example, pre-existing VME functions on a graphics processor are used to perform a relatively fast preprocessing of each frame prior to frame encoding. The result of the preprocessing may then be used by a host processor encoder to decide for a particular block if checking intra prediction thoroughly is appropriate. Skipping the intra prediction coding stage entirely may substantially reduce encoding time.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
   a mass storage device to store a video frame associated with a media signal;
   a graphics processor including an intra prediction preprocessor to determine an intra prediction error for a coding unit of the video frame; and
   a host processor including an encoder having an intra prediction coding stage, the encoder to selectively bypass the intra prediction coding stage with respect to a recursive split decision based at least in part on the intra prediction error;
   wherein the graphics processor further includes an inter prediction preprocessor to determine an inter prediction error for the coding unit, and wherein the intra prediction coding stage is to be selectively bypassed further based on the inter prediction error;
   wherein the host processor further includes a ratio monitor to determine a ratio of the intra prediction error to the inter prediction error, and wherein the intra prediction coding stage is to be bypassed if the ratio exceeds a threshold.

2. The system of claim 1, wherein the intra prediction error and the inter prediction error are to include sum of absolute difference (SAD) values.

3. The system of claim 1, wherein the inter prediction preprocessor includes:
   a vector locator to identify a motion vector for the frame relative to a reference frame; and
   a vector modifier to refine the motion vector to obtain the inter prediction error.

4. The system of claim 1, wherein the encoder includes a unit size adjuster to map the intra prediction error and the inter prediction error to a different sized coding unit.

5. A method comprising:
   determining, on a graphics processor, an intra prediction error for a coding unit of a video frame; and
   selectively bypassing, on a host processor, an intra prediction coding stage with respect to a recursive split decision based at least in part on the intra prediction error;
   determining, on the graphics processor, an inter prediction error for the coding unit, wherein the intra prediction coding stage is selectively bypassed further based on the inter prediction error;
   determining a ratio of the intra prediction error to the inter prediction error, wherein the intra prediction coding stage is bypassed if the ratio exceeds a threshold.

6. The method of claim 5, wherein the intra prediction error and the inter prediction error include sum of absolute difference (SAD) values.

7. The method of claim 5, wherein determining the inter prediction error includes:
identifying a motion vector for the frame relative to a reference frame; and
refining the motion vector to obtain the inter prediction error.

8. The method of claim 5, further including mapping, on the host processor, the intra prediction error and the inter prediction error to a different sized coding unit.

9. At least one non-transitory computer readable storage medium comprising a set of instructions which, when executed by a computing system including a graphics processor and a host processor, cause the computing system to:
determine, on the graphics processor, an intra prediction error for a coding unit of a video frame; and
selectively bypass, on the host processor, an intra prediction coding stage with respect to a recursive split decision based at least in part on the intra prediction error;
wherein the instructions, when executed, cause the computing system to determine, on the graphics processor, an inter prediction error for the coding unit, and wherein the intra prediction coding stage is to be selectively bypassed further based on the inter prediction error;
wherein the instructions, when executed, cause the computing system to determine a ratio of the intra prediction error to the inter prediction error, and wherein the intra prediction coding stage is to be bypassed if the ratio exceeds a threshold.

10. The at least one non-transitory computer readable storage medium of claim 9, wherein the intra prediction error and the inter prediction error are to include sum of absolute difference (SAD) values.

11. The at least one non-transitory computer readable storage medium of claim 9, wherein the instructions, when executed, further cause the computing system to:
identify a motion vector for the frame relative to a reference frame; and
refine the motion vector to obtain the inter prediction error.

12. The at least one non-transitory computer readable storage medium of claim 9, wherein the instructions, when executed, cause the computing system to map, on the host processor, the intra prediction error and the inter prediction error to a different sized coding unit.

13. An apparatus comprising:
a graphics processor including an intra prediction preprocessor to determine an intra prediction error for a coding unit of a video frame; and
a host processor including an encoder having an intra prediction coding stage, the encoder to selectively bypass the intra prediction coding stage with respect to a recursive split decision based at least in part on the intra prediction error;
wherein the graphics processor further includes an inter prediction preprocessor to determine an inter prediction error for the coding unit, and wherein the intra prediction coding stage is to be selectively bypassed further based on the inter prediction error;
wherein the host processor further includes a ratio monitor to determine a ratio of the intra prediction error to the inter prediction error, and wherein the intra prediction coding stage is to be bypassed if the ratio exceeds a threshold.

14. The apparatus of claim 13, wherein the intra prediction error and the inter prediction error are to include sum of absolute difference (SAD) values.

15. The apparatus of claim 13, wherein the inter prediction preprocessor includes:
a vector locator to identify a motion vector for the frame relative to a reference frame; and
a vector modifier to refine the motion vector to obtain the inter prediction error.

16. The apparatus of claim 13, wherein the encoder includes a unit size adjuster to map the intra prediction error and the inter prediction error to a different sized coding unit.

* * * * *